Patented Apr. 4, 1939

2,153,043

UNITED STATES PATENT OFFICE 2,153,043

PROCESS OF MAKING THE PIPERIDINE SALT OF PENTAMETHYLENE-DITHIO-CARBAMIC ACID

Marion W. Harman, Nitro, W. Va., assignor to Monsanto Chemical Company, St. Louis, Mo., a corporation of Delaware No Drawing. Application April 24, 1936, Serial No. 76,266

4 Claims. (Cl. 260—293)

The present invention relates to a new and improved process for the manufacture of the piperidine salt of pentamethylene-dithio-carbamic acid.

More particularly, the present invention comprises the preparation of the piperidine salt of pentamethylene-dithio-carbamic acid by reacting piperidine and carbon disulfide in the presence of a solvent comprising an aliphatic ketone having a boiling point below substantially 150° C., as for example acetone, and preferably at a low temperature, for example 0° to 15° C.

By the operation of the present invention a high yield of a product having a high melting point is obtained.

A further advantage of the process of the present invention is the separation of the product from the solvent in the form of heavy granular crystals which are readily filtered and washed free of impurities. This further makes possible the separation of the major portion of the mother liquor by decantation, if desirable.

A further advantage of the process of the present invention is the production of a lighter colored product than has been heretofore commercially possible with the use of other solvents. It is believed this is due to the solvent action of the ketones of the present invention for certain colored impurities in the reaction product. In the preparation of light colored rubber goods the use of an accelerator free from color is highly advantageous.

A further advantage of the process of the present invention is the fact that the temperature of the reaction mixture is readily controlled and the heat transfer is good since the crystals produced occupy a relatively small volume. When employing other solvents, such as for example gasoline and benzene, a mat of fine feathery needles separates which is a poor conductor of heat tending to interfere with the temperature control of the reaction.

As one specific embodiment of the invention and not to be understood as limitative of the scope thereof, 183 parts by weight of piperidine having a purity of 93% (substantially two molecular proportions) and substantially 1400 parts by weight of acetone are placed in a suitable reactor and the acetone solution of piperidine cooled to a temperature of substantially 0° to 15° C. and preferably to a temperature of 0° to 5° C. To the acetone solution of piperidine so produced, 80 parts by weight of carbon disulfide (a slight excess over substantially one molecular proportion) are added with agitation meanwhile maintaining the reaction temperature below 15° C. and preferably at 0° to 5° C. The white crystals which precipitate are separated from the mother liquor in a convenient manner, as for example by filtering, washed with acetone and dried at a convenient temperature, for example 50° C. The product so prepared was obtained in 93% yield and had a melting point of 170° to 171° C.

A preparation of the piperidine salt of pentamethylene-dithio-carbamic acid carried out by reacting piperidine of the same purity as that employed above and carbon disulfide in a manner analogous to that hereinbefore set forth, with the exception that gasoline was employed as the solvent instead of the ketones of the present invention, gave a product having a melting range of 140° to 160° C.

A preparation of the piperidine salt of pentamethylene-dithio-carbamic acid carried out by reacting piperidine and carbon disulfide in the presence of benzene as the solvent gave a product melting at 150° to 157° C.

It is thus readily shown that the process of the present invention produces a piperidine salt of pentamethylene-dithio-carbamic acid having a marked improvement in purity over that heretofore commercially obtainable.

If convenient or desirable the piperidine may be added to the ketone solution of the carbon disulfide instead of adding the carbon disulfide to the ketone solution of piperidine as described above.

The solvent may be recovered from the filtrate by distillation or it may be employed in succeeding batches with such additions of solvent as may be required to compensate for mechanical losses, until too much of the impurities have accumulated. On carrying out a series of three runs in the manner described above wherein the acetone filtrate from one run was employed as the solvent for the next with the addition of the necessary quantity of fresh acetone to compensate for losses, an average yield of 96% of theoretical was obtained, which product had a melting point of 170°–171° C.

As further specific embodiments of the present invention and further exemplifying the use of aliphatic ketones having a boiling point below substantially 150° C. methyl ethyl ketone, methyl iso propyl ketone and dipropyl ketone have been employed as solvents in the preparation of the piperidine salt of pentamethylene-dithio-carbamic acid by reacting substantially two molecular proportions of piperidine and substantially one molecular proportion of carbon disulfide, preferably at a temperature of substantially 0° to 15° C. In all cases piperidine-pentamethylene-dithio-carbamate was obtained in good yield and having a high degree of purity.

In the operation of the process of the present invention piperidine of varying degrees of purity may be employed. Further, varying quantities of the ketonic solvent may be employed.

The invention is limited solely by the following claims.

What is claimed is:

1. The process of making the piperidine salt of pentamethylene-dithio-carbamic acid which comprises reacting piperidine and carbon disulfide in the presence of an aliphatic ketone having a boiling point below substantially 150° C., at a temperature of substantially 0° to 15° C.

2. The process of making the piperidine salt of pentamethylene - dithio - carbamic acid which comprises reacting piperidine and carbon disulfide in the presence of acetone at a temperature of substantially 0° to 15° C.

3. The process of making the piperidine salt of pentamethylene - dithio - carbamic acid which comprises reacting piperidine and carbon disulfide in the presence of acetone at a temperature of substantially 0° to 15° C., separating the piperidine salt of pentamethylene-dithio-carbamic acid therefrom and drying it at a temperature below 50° C.

4. In a process of making the piperidine salt of pentamethylene - dithio - carbamic acid the steps in combination comprising adding substantially one molecular proportion of carbon disulfide to an acetone solution of substantially two molecular proportions of piperidine at a temperature of substantially 0° to 15° C., maintaining the reaction at a temperature of substantially 0° to 15° C., separating the precipitated piperidine salt of pentamethylene-dithio-carbamic acid therefrom and drying it at a temperature below substantially 50° C.

MARION W. HARMAN.